United States Patent
Ciarafoni et al.

(10) Patent No.: US 8,575,272 B2
(45) Date of Patent: Nov. 5, 2013

(54) POLYOLEFINIC COMPOSITIONS

(75) Inventors: Marco Ciarafoni, Ferrara (IT); Paola Massari, Ferrara (IT); Gisella Biondini, Portomaggiore (IT); Roberto Pantaleoni, Ferrara (IT)

(73) Assignee: Basell Poliolefine Italia S.r.l., Milan (IT)

( * ) Notice: Subject to any disclaimer, the term of this patent is extended or adjusted under 35 U.S.C. 154(b) by 0 days.

(21) Appl. No.: 13/386,381

(22) PCT Filed: Jul. 20, 2010

(86) PCT No.: PCT/EP2010/060461
§ 371 (c)(1),
(2), (4) Date: Mar. 13, 2012

(87) PCT Pub. No.: WO2011/012491
PCT Pub. Date: Feb. 3, 2011

(65) Prior Publication Data
US 2012/0172533 A1      Jul. 5, 2012

Related U.S. Application Data

(60) Provisional application No. 61/274,147, filed on Aug. 13, 2009.

(30) Foreign Application Priority Data

Jul. 31, 2009   (EP) .................... 09167003

(51) Int. Cl.
C08L 23/12      (2006.01)
C08F 297/08     (2006.01)
C08J 5/18       (2006.01)

(52) U.S. Cl.
USPC ............ 525/197; 525/240; 524/581

(58) Field of Classification Search
USPC ............ 525/197, 240; 524/581
See application file for complete search history.

(56) References Cited

U.S. PATENT DOCUMENTS

| 4,298,718 | A | 11/1981 | Mayr |
| 4,399,054 | A | 8/1983 | Ferraris |
| 4,469,648 | A | 9/1984 | Ferraris |
| 4,472,524 | A | 9/1984 | Albizzati |
| 4,472,525 | A | 9/1984 | Singleton |
| 4,495,338 | A | 1/1985 | Mayr |
| 4,522,930 | A | 6/1985 | Albizzati |
| 6,759,465 | B1 * | 7/2004 | Shimojo et al. ............ 524/451 |
| 7,795,352 | B2 * | 9/2010 | Massari et al. ............ 525/240 |
| 2009/0253868 | A1 * | 10/2009 | Massari et al. ............ 525/240 |

FOREIGN PATENT DOCUMENTS

| EP | 45977 | 3/1986 |
| EP | 361493 | 4/1990 |
| EP | 0361493 | 11/1994 |
| EP | 728769 | 8/1996 |
| EP | 0841369 | 5/1998 |
| WO | WO 00/63261 | 10/2000 |
| WO | WO-0157099 | 8/2001 |
| WO | WO-2006/067023 | 6/2006 |
| WO | WO 2006/067023 | 6/2006 |
| WO | WO 2006/125720 | 11/2006 |
| WO | WO-2006125720 | 11/2006 |
| WO | WO-2007/060114 | 5/2007 |

OTHER PUBLICATIONS

Chujo, R et al., "Two-site model analysis of 13C n.m.r. of polypropylene polmerized by . . . ", Polymer, vol. 35, No. 2 1994, 339.

Inoue, Y. et al., "Studies of the stereospecific polymerization mechanism of propylene by a modified . . . ", Polymer, vol. 25, Nov. 1984, 1640.

* cited by examiner

Primary Examiner — Nathan M Nutter

(57) ABSTRACT

A polymer composition comprising (percent by weight):
a) 57%-74%, of a crystalline propylene polymer having an amount of isotactic pentads (mmmm), measured by $^{13}$C-MNR on the fraction insoluble in xylene at 25° C., higher than 97.5 molar % and a polydispersity index ranging from 5 to 10;
b) 8 to 15%, of an elastomeric copolymer of ethylene and propylene, the copolymer having an amount of recurring units deriving from ethylene ranging from 30 to 50%, and being partially soluble in xylene at ambient temperature; the polymer fraction soluble in xylene at ambient temperature having an intrinsic viscosity value ranging from 2.5 to 3.5 dl/g; and
c) 18-28%, of ethylene homopolymer having an intrinsic viscosity value ranging from 1.5 to 4 dl/g;
said composition having a value of melt flow rate ranging from 35 to 60 g/10 min, and the amount of hexane extractables lower than 4.0 wt %.

4 Claims, No Drawings

POLYOLEFINIC COMPOSITIONS

This application is the U.S. national phase of International Application PCT/EP2010/060461, filed Jul. 20, 2010, claiming priority to European Application 09167003.4 filed Jul. 31, 2009 and the benefit under 35 U.S.C. 119(e) of U.S. Provisional Application No. 61/274,147, filed Aug. 13, 2009; the disclosures of International Application PCT/EP2010/060461, European Application 09167003.4 and U.S. Provisional Application No. 61/274,147, each as filed, are incorporated herein by reference.

The present invention relates to polyolefin compositions having a good balance of mechanical properties and a process to prepare said compositions. In particular, the compositions exhibits low amount of hexane extractables so that it is fit for food packaging and the like.

As is known, the isotactic polypropylene, though being endowed with an exceptional combination of excellent properties, is affected by the drawback of possessing an insufficient impact resistance at relatively low temperatures.

According to the teaching of the prior art, it is possible to obviate the said drawback and maintain whitening resistance, without sensibly affecting the other polymer properties, by properly adding rubbers and polyethylene to the polypropylene.

WO 2006/125720 relates to a polypropylene composition comprising (percent by weight):
a) 65-77%, of a crystalline propylene polymer having an amount of isotactic pentads (mmmm), measured by $^{13}$C-MNR on the fraction insoluble in xylene at 25° C., higher than 97.5 molar %;
b) 8 to less than 13%, of an elastomeric copolymer of ethylene and propylene, the copolymer having an amount of recurring units deriving from ethylene ranging from 30 to 70%, and being partially soluble in xylene at ambient temperature; the polymer fraction soluble in xylene at ambient temperature having an intrinsic viscosity value ranging from 2 to 4 dl/g; and
c) 10-23%, of polyethylene having an intrinsic viscosity value ranging from 1.5 to 4 dl/g and optionally containing recurring units derived from propylene in amounts lower than 10%.

The composition typically has a value of melt flow rate ranging from 0.50 to 10 g/10 min.

WO 2006/067023 relates to a polypropylene composition comprising (percent by weight):
a) 50-77%, of a crystalline propylene polymer having an amount of isotactic pentads (mmmm), measured by $^{13}$C NMR on the fraction insoluble in xylene at 25° C., higher than 97.5 molar % and a polydispersity index ranging from 4 to 10;
b) 13-28%, of an elastomeric copolymer of ethylene and propylene, the copolymer having an amount of recurring units deriving from ethylene ranging from 30 to 70%, being partially soluble in xylene at ambient temperature, the polymer fraction soluble in xylene at ambient temperature having an intrinsic viscosity value ranging from 2 to 4 dl/g; and
c) 10-22%, preferably 10 to 20%, of polyethylene having an intrinsic viscosity value ranging from 1 to 3 dl/g and optionally containing recurring units deriving from propylene in amounts up to less than 10%.

The composition typically has a value of melt flow rate ranging from 10 to 30 g/10 min.

The applicant found that it is possible to improve the hexane extractables of similar compositions so that to obtain a material fit for food applications and at the same time maintaining good stress-whitening resistance properties by using a polymer composition having certain features.

Thus, an object of the present invention is a polymer composition comprising (percent by weight):
a) 57%-74%, preferably 62% to 71%, of a crystalline propylene polymer having an amount of isotactic pentads (mmmm), measured by $^{13}$C-MNR on the fraction insoluble in xylene at 25° C., higher than 97.5 molar % and a polydispersity index ranging from 5 to 10;
b) 8 to 15%, preferably 9 to 12%, of an elastomeric copolymer of ethylene and propylene, the copolymer having an amount of recurring units deriving from ethylene ranging from 30 to 50 wt %, preferably 40 to 48 wt %, and being partially soluble in xylene at ambient temperature; the polymer fraction soluble in xylene at ambient temperature having an intrinsic viscosity value ranging from 2.5 to 3.5 dl/g; preferably from 2.5 and 3.0 and
c) 18-28%, preferably 20 to 25%, of ethylene homopolymer having an intrinsic viscosity value ranging from 1.5 to 4 dl/g; said composition having a value of melt flow rate ranging from 35 to 60 g/10 min, preferably 45 to 60 g/10 min, more preferably from 50 to 57 g/10 min and the amount of hexane extractables lower than 4.0 wt %, preferably lower than 3.5 wt %.

By ambient temperature and room temperature is meant a temperature of 25° C. By elastomeric polymer is meant a polymer having a solubility in xylene at ambient temperature (25° C.) higher than 50 wt %. By crystalline propylene polymer is meant a polymer having an amount of isotactic pentads (mmmm), measured by $^{13}$C-MNR on the fraction insoluble in xylene at 25° C., higher than 97.5 molar %.

Preferably the composition has a content of component (b) plus component (c) in amounts comprised between 25 wt % and 35 wt %.

Typically, the composition of the present invention exhibits a flexural modulus value at least 1300 MPa, preferably it is comprised between 1300 MPa and 1500 MPa.

Stress-whitening resistance values corresponding to a diameter of the whitened area of at most 220 mm caused by a ram falling from a 76 cm height and a diameter of the whitened area of at most 160 mm caused by a ram falling from a 20 cm height.

Crystalline propylene polymer (a) is selected from a propylene homopolymer and a copolymer of propylene containing at most 3 wt % of ethylene or a $C_4$-$C_{10}$ α-olefin or combination thereof. Particularly preferred is the propylene homopolymer.

Typically crystalline propylene polymer (a) shows a molecular weight distribution, expressed by the ratio between the weight average molecular weight and numeric average molecular weight, i.e. $\overline{M}_w/\overline{M}_n$, measured by GPC, equal to or higher than 7.5, in particular from 8 to 20. The melt flow rate of crystalline propylene polymer (a) typically ranges from 150 to 250 g/10 min, preferably from 180 to 220 g/10 min, more preferably from 190 to 210 g/10 min.

Typically crystalline propylene polymer (a) shows a value of z average molecular weight to numeric average molecular weight ratio, i.e. $\overline{M}_z/\overline{M}_w$, measured by GPC, of at least 3.5, preferably 4, more preferably 5, for example from 9 to 10.

Elastomeric ethylene-propylene copolymer (b) can optionally comprise a diene. When present, the diene is typically in amounts ranging from 0.5 to 10 wt % with respect to the weight of copolymer (b). The diene can be conjugated or not and is selected from butadiene, 1,4-hexadiene, 1,5-hexadiene, and ethylidene-norbornene-1, for example.

Elastomeric ethylene-propylene copolymer (b) can optionally comprise a diene. When present, the diene is typically in amounts ranging from 0.5 to 10 wt % with respect to the weight of copolymer (b). The diene can be conjugated or not and it is preferably selected from butadiene, 1,4-hexadiene, 1,5-hexadiene, and ethylidene-norbornene-1. The intrinsic viscosity of the soluble fraction in xylene at room temperature is comprised between 1.5 and 4.0 dl/g; preferably between 2.0 and 3.5 dl/g; more preferably between 2.5 and 3.2 dl/g.

Polyethylene (c) is crystalline or semicrystalline and is selected from ethylene homopolymer. The intrinsic viscosity values of copolymer (c) are preferably within the range from 2.0-3.5 dl/g.

The composition of the present invention is obtained by means of a sequential copolymerization process.

Therefore, the present invention is further directed to a process for the preparation of the polyolefin compositions as reported above, said process comprising at least three sequential polymerization stages with each subsequent polymerization being conducted in the presence of the polymeric material formed in the immediately preceding polymerization reaction, wherein the polymerization stage of propylene to the crystalline polymer (a) is carried out in at least one stage, than a copolymerization stage of mixtures of ethylene with propylene (and optionally a diene) to elastomeric polymer (b) and finally a polymerization stage of ethylene to polyethylene (c) are carried out. The polymerisation stages may be carried out in the presence of a stereospecific Ziegler-Natta catalyst.

According to a preferred embodiment, all the polymerisation stages are carried out in the presence of a catalyst comprising a trialkylaluminium compound, optionally an electron donor, and a solid catalyst component comprising a halide or halogen-alcoholate of Ti and an electron-donor compound supported on anhydrous magnesium chloride. Catalysts having the above-mentioned characteristics are well known in the patent literature; particularly advantageous are the catalysts described in U.S. Pat. No. 4,399,054 and EP-A-45 977. Other examples can be found in U.S. Pat. No. 4,472,524.

Preferably the polymerisation catalyst is a Ziegler-Natta catalyst comprising a solid catalyst component comprising:
a) Mg, Ti and halogen and an electron donor (internal donor),
b) an alkylaluminum compound and, optionally (but preferably),
c) one or more electron-donor compounds (external donor).

The internal donor is preferably selected from the esters of mono or dicarboxylic organic acids such as benzoates, malonates, phthalates and certain succinates. They are described in U.S. Pat. No. 4,522,930, European patent 45977 and international patent applications WO 00/63261 and WO 01/57099, for example. Particularly suited are the phthalic acid esters and succinate acids esters. Alkylphthalates are preferred, such as diisobutyl, dioctyl and diphenyl phthalate and benzyl-butyl phthalate.

Among succinates, they are preferably selected from succinates of the formula (I):

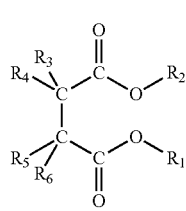

(I)

wherein the radicals $R_1$ and $R_2$, equal to or different from each other, are a $C_1$-$C_{20}$ linear or branched alkyl, alkenyl, cycloalkyl, aryl, arylalkyl or alkylaryl group, optionally containing heteroatoms; the radicals $R_3$ to $R_6$, equal to or different from each other, are hydrogen or a $C_1$-$C_{20}$ linear or branched alkyl, alkenyl, cycloalkyl, aryl, arylalkyl or alkylaryl group, optionally containing heteroatoms, and the radicals $R_3$ to $R_6$ which are joined to the same carbon atom can be linked together to form a cycle; with the proviso that when $R_3$ to $R_5$ are contemporaneously hydrogen, $R_6$ is a radical selected from primary branched, secondary or tertiary alkyl groups, cycloalkyl, aryl, arylalkyl or alkylaryl groups having from 3 to 20 carbon atoms;
or of formula (II):

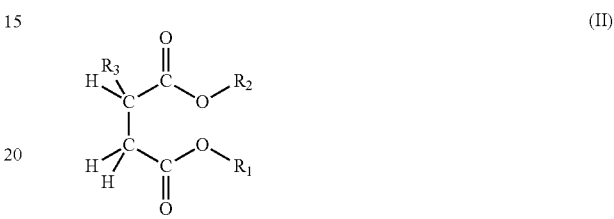

(II)

wherein the radicals $R_1$ and $R_2$, equal to or different from each other, are a $C_1$-$C_{20}$ linear or branched alkyl, alkenyl, cycloalkyl, aryl, arylalkyl or alkylaryl group, optionally containing heteroatoms and the radical $R_3$ is a linear alkyl group having at least four carbon atoms optionally containing heteroatoms.

The Al-alkyl compounds used as co-catalysts comprise Al-trialkyls, such as Al-triethyl, Al-triisobutyl, Al-tri-n-butyl, and linear or cyclic Al-alkyl compounds containing two or more Al atoms bonded to each other by way of O or N atoms, or $SO_4$ or $SO_3$ groups. The Al-alkyl compound is generally used in such a quantity that the Al/Ti ratio be from 1 to 1000.

External donor (c) can be of the same type or it can be different from the succinates of formula (I) or (II). Suitable external electron-donor compounds include silicon compounds, ethers, esters such as phthalates, benzoates, succinates also having a different structure from those of formula (I) or (II), amines, heterocyclic compounds and particularly 2,2,6,6-tetramethylpiperidine, ketones and the 1,3-diethers of the general formula (III):

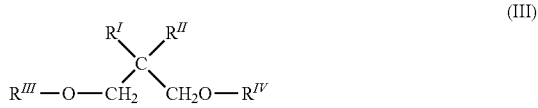

(III)

wherein $R^I$ and $R^{II}$ are the same or different and are $C_1$-$C_{18}$ alkyl, $C_3$-$C_{18}$ cycloalkyl or $C_7$-$C_{18}$ aryl radicals; $R^{III}$ and $R^{IV}$ are the same or different and are $C_1$-$C_4$ alkyl radicals; or the 1,3-diethers in which the carbon atom in position 2 belongs to a cyclic or polycyclic structure made up of 5, 6 or 7 carbon atoms and containing two or three unsaturations.

Ethers of this type are described in published European patent applications 361493 and 728769. Preferred electron-donor compounds that can be used as external donors include aromatic silicon compounds containing at least one Si—OR bond, where R is a hydrocarbon radical. A particularly preferred class of external donor compounds is that of silicon compounds of formula $R_a^7R_b^8Si(OR^9)_c$, where a and b are integer from 0 to 2, c is an integer from 1 to 3 and the sum (a+b+c) is 4; $R^7$, $R^8$, and $R^9$, are $C_1$-$C_{18}$ hydrocarbon groups optionally containing heteroatoms. Particularly preferred are the silicon compounds in which a is 1, b is 1, c is 2, at least one of $R^7$ and $R^8$ is selected from branched alkyl, alkenyl, alkylene, cycloalkyl or aryl groups with 3-10 carbon atoms optionally containing heteroatoms and $R^9$ is a $C_1$-$C_{10}$ alkyl group, in particular methyl. Examples of such preferred silicon compounds are cyclohexyltrimethoxysilane, t-butyltrimethoxysilane, t-hexyltrimethoxysilane, cyclohexylmethyldimethoxysilane, 3,3,3-trifluoropropyl-2-ethylpiperidyldimethoxysilane, diphenyldimethoxysilane, methyl-t-butyldimethoxysilane, dicyclopentyldimethoxysilane, 2-ethylpiperidinyl-2-t-butyldimethoxysilane, (1,1,1-trifluoro-2-propyl)-methyldimethoxysilane and (1,1,1-trifluoro-2-propyl)-2-ethylpiperidinyldimethoxysilane. Moreover, are also preferred the silicon compounds in which a is 0, c is 3, $R^8$ is a branched alkyl or cycloalkyl group, optionally containing heteroatoms, and $R^9$ is methyl. Particularly preferred specific examples of silicon compounds are $(tert-butyl)_2Si(OCH_3)_2$, $(cyclohexyl)(methyl) Si(OCH_3)_2$, $(phenyl)_2Si(OCH_3)_2$ and $(cyclopentyl)_2Si(OCH_3)_2$.

Preferably electron donor compound (c) is used in such an amount to give a molar ratio between the organoaluminum compound and said electron donor compound (c) of from 0.1 to 500, more preferably from 1 to 300 and in particular from 3 to 100.

As explained above, the solid catalyst component comprises, in addition to the above electron donors, Ti, Mg and halogen. In particular, the catalyst component comprises a titanium compound, having at least a Ti-halogen bond, and the above mentioned electron donor compounds supported on a Mg halide. The magnesium halide is preferably $MgCl_2$ in active form, which is widely known from the patent literature as a support for Ziegler-Natta catalysts. Patents U.S. Pat. No. 4,298,718 and U.S. Pat. No. 4,495,338 were the first to describe the use of these compounds in Ziegler-Natta catalysis. It is known from these patents that the magnesium dihalides in active form used as support or co-support in components of catalysts for the polymerisation of olefins are characterized by X-ray spectra in which the most intense diffraction line that appears in the spectrum of the non-active halide is diminished in intensity and is replaced by a halo whose maximum intensity is displaced towards lower angles relative to that of the more intense line.

The preferred titanium compounds are $TiCl_4$ and $TiCl_3$; furthermore, also Ti-haloalcoholates of formula $Ti(OR)_{n-y}X_y$ can be used, where n is the valence of titanium, y is a number between 1 and n, X is halogen and R is a hydrocarbon radical having from 1 to 10 carbon atoms.

The preparation of the solid catalyst component can be carried out according to several methods, well known and described in the art.

According to a preferred method, the solid catalyst component can be prepared by reacting a titanium compound of formula $Ti(OR)n-yX_y$, where n is the valence of titanium and y is a number between 1 and n, preferably $TiCl_4$, with a magnesium chloride deriving from an adduct of formula $MgCl_2 \cdot pROH$, where p is a number between 0.1 and 6, preferably from 2 to 3.5, and R is a hydrocarbon radical having 1-18 carbon atoms. The adduct can be suitably prepared in spherical form by mixing alcohol and magnesium chloride in the presence of an inert hydrocarbon immiscible with the adduct, operating under stirring conditions at the melting temperature of the adduct (100-130° C.). Then, the emulsion is quickly quenched, thereby causing the solidification of the adduct in form of spherical particles.

Examples of spherical adducts prepared according to this procedure are described in U.S. Pat. No. 4,399,054 and U.S. Pat. No. 4,469,648. The so obtained adduct can be directly reacted with the Ti compound or it can be previously subjected to thermally controlled dealcoholation (80-130° C.) so as to obtain an adduct in which the number of moles of alcohol is generally lower than 3, preferably between 0.1 and 2.5. The reaction with the Ti compound can be carried out by suspending the adduct (dealcoholated or as such) in cold $TiCl_4$ (generally 0° C.); the mixture is heated up to 80-130° C. and kept at this temperature for 0.5-2 hours. The treatment with $TiCl_4$ can be carried out one or more times. The electron donor compound(s) can be added during the treatment with $TiCl_4$.

Regardless of the preparation method used, the final amount of the electron donor compound(s) is preferably such that the molar ratio with respect to the $MgCl_2$ is from 0.01 to 1, more preferably from 0.05 to 0.5.

The said catalyst components and catalysts are described in WO 00/63261 and WO 01/57099.

The catalysts may be precontacted with small quantities of olefin (prepolymerisation), maintaining the catalyst in suspension in a hydrocarbon solvent, and polymerising at temperatures from ambient to 60° C., thus producing a quantity of polymer from 0.5 to 3 times the weight of the catalyst. The operation can also take place in liquid monomer, producing, in this case, a quantity of polymer 1000 times the weight of the catalyst.

By using the above mentioned catalysts, the polyolefin compositions are obtained in spheroidal particle form, the particles having an average diameter from about 250 to 7,000 microns, a flowability of less than 30 seconds and a bulk density (compacted) greater than 0.4 g/ml.

The polymerisation stages may occur in liquid phase, in gas phase or liquid-gas phase. Preferably, the polymerisation of crystalline polymer (a) is carried out in liquid monomer (e.g. using liquid propylene as diluent), while the copolymerisation stages of elastomeric copolymer (b) and polyethylene (c) are carried out in gas phase. Alternatively, all the three sequential polymerisation stages can be carried out in gas phase.

The reaction temperature in the polymerisation stage for the preparation of crystalline polymer (a) and in the preparation of elastomeric copolymer (b) and polyethylene (c) be the same or different, and is preferably from 40 to 100° C.; more preferably, the reaction temperature ranges from 50 to 80° C. in the preparation of polymer (a), and from 70 to 100° C. for the preparation of polymer components (b) and (c).

The pressure of the polymerisation stage to prepare polymer (a), if carried out in liquid monomer, is the one which competes with the vapor pressure of the liquid propylene at the operating temperature used, and it may be modified by the vapor pressure of the small quantity of inert diluent used to feed the catalyst mixture, by the overpressure of optional monomers and by the hydrogen used as molecular weight regulator.

The polymerisation pressure preferably ranges from 33 to 43 bar, if done in liquid phase, and from 5 to 30 bar if done in gas phase. The residence times relative to the two stages depend on the desired ratio between polymers (a) and (b) and (c), and can usually range from 15 minutes to 8 hours. Conventional molecular weight regulators known in the art, such as chain transfer agents (e.g. hydrogen or $ZnEt_2$), may be used.

Conventional additives, fillers and pigments, commonly used in olefin polymers, may be added, such as nucleating agents, extension oils, mineral fillers, and other organic and inorganic pigments. In particular, the addition of inorganic fillers, such as talc, calcium carbonate and mineral fillers, also brings about an improvement to some mechanical properties, such as flexural modulus and HDT. Talc can also have a nucleating effect.

The nucleating agents are added to the compositions of the present invention in quantities ranging from 0.05 to 2% by weight, more preferably from 0.1 to 1% by weight, with respect to the total weight, for example.

The particulars are given in the following examples, which are given to illustrate, without limiting, the present invention.

The following analytical methods have been used to determine the properties reported in the detailed description and in the examples.

Ethylene:
By IR spectroscopy.
Fractions Soluble and Insoluble in Xylene at 25° C.:
2.5 g of polymer are dissolved in 250 mL of xylene at 135° C. under agitation. After 20 minutes the solution is allowed to cool to 25° C., still under agitation, and then allowed to settle for 30 minutes. The precipitate is filtered with filter paper, the solution evaporated in nitrogen flow, and the residue dried under vacuum at 80° C. until constant weight is reached. Thus one calculates the percent by weight of polymer soluble and insoluble at room temperature (25° C.).

Intrinsic Viscosity [η]:
Measured in tetrahydronaphthalene at 135° C.
Molecular Weight ($\overline{M}_n$, $\overline{M}_w$, $\overline{M}_z$):
Measured by way of gel permeation chromatography (GPC) in 1,2,4-trichlorobenzene.

Determination of Isotactic Pentads Content:
50 mg of each xylene insoluble fraction were dissolved in 0.5 mL of $C_2D_2Cl_4$.

The $^{13}$C NMR spectra were acquired on a Bruker DPX-400 (100.61 Mhz, 90° pulse, 12 s delay between pulses). About 3000 transients were stored for each spectrum; mmmm pentad peak (21.8 ppm) was used as reference.

The microstructure analysis was carried out as described in literature (Polymer, 1984, 25, 1640, by Inoue Y. et Al. and Polymer, 1994, 35, 339, by Chujo R. et Al.).

Polydispersity Index:
Determined at a temperature of 200° C. by using a parallel plates rheometer model RMS-800 marketed by RHEOMETRICS (USA), operating at an oscillation frequency which increases from 0.1 rad/sec to 100 rad/sec. From the crossover modulus one can derive the P.I. by way of the equation:

$$P.I.=10^5/Gc$$

in which Gc is the crossover modulus which is defined as the value (expressed in Pa) at which G'=G" wherein G' is the storage modulus and G" is the loss modulus.

This method is used for polymers having an MFR value of 20 g/10 min or less.

Polydispersity Index:
Measurement of molecular weight distribution of the polymer. To determine the PI value, the modulus separation at loss modulus value, e.g. 500 Pa, is determined at a temperature of 200° C. by using a RMS-800 parallel plates rheometer model marketed by Rheometrics (USA), operating at an oscillation frequency which increases from 0.01 rad/second to 100 rad/second. From the modulus separation value, the PI can be derived using the following equation:

$$PI=54.6\times(\text{modulus separation})^{-1.76}$$

wherein the modulus separation (MS) is defined as:

$$MS=(\text{frequency at }G'=500\text{ Pa})/(\text{frequency at }G''=500\text{ Pa})$$

wherein G' is the storage modulus and G" is the loss modulus.

This method is used for polymers having an MFR value over 20 g/10 min.

Determination of Isotactic Pentads Content:
50 mg of each xylene insoluble fraction were dissolved in 0.5 mL of $C_2D_2Cl_4$.

The $^{13}$C NMR spectra were acquired on a Bruker DPX-400 (100.61 Mhz, 90° pulse, 12 s delay between pulses). About 3000 transients were stored for each spectrum; mmmm pentad peak (21.8 ppm) was used as reference.

The microstructure analysis was carried out as described in literature (Polymer, 1984, 25, 1640, by Inoue Y. et Al. and Polymer, 1994, 35, 339, by Chujo R. et Al.).

Melt Flow Rate:
Determined according to ISO method 1133 (230° C. and 2.16 kg).

Flexural Modulus:
Determined according to ISO method 178.

Izod Impact Resistance:
Determined according to ISO method 180/1A.

Stress-Whitening Resistance:
The resistance to whitening is determined by subjecting to the impact of a ram having a 76 g weight small discs, which have a 4 cm diameter and prepared by injection moulding, prepared from the polymer being tested. Both the minimum height (h) up to the maximum height allowed by the apparatus necessary to obtain whitening, and the width (diameter) of the whitened area are recorded.

1640, by Inoue Y. et Al. and Polymer, 1994, 35, 339, by Chujo R. et Al.).

Polydispersity Index:
Measurement of molecular weight distribution of the polymer. To determine the PI value, the modulus separation at loss modulus value, e.g. 500 Pa, is determined at a temperature of 200° C. by using a RMS-800 parallel plates rheometer model marketed by Rheometrics (USA), operating at an oscillation frequency which increases from 0.01 rad/second to 100 rad/second. From the modulus separation value, the PI can be derived using the following equation:

$$PI=54.6\times(\text{modulus separation})^{-1.76}$$

wherein the modulus separation (MS) is defined as:

$$MS=(\text{frequency at }G'=500\text{ Pa})/(\text{frequency at }G''=500\text{ Pa})$$

wherein G' is the storage modulus and G" is the loss modulus.

This method is used for polymers having an MFR value over 20 g/10 min.

TREF Method for the Separation of Polyethylene
The column used was a stainless steel fractionating column filled with pennax glass beads with 1-1.2 mm diameter.

About 1.5 g of the purified sample was dissolved in hot o-xylene. The solution was loaded in the TREF column and then a slow cooling program was applied. Every elution step was performed at a constant temperature and flow rate (10 ml/min). The flow was interrupted to allow thermal equilibrium to be reached. Five fraction are collected at different temperatures by using o-xylene (fraction1, 3-5) and butoxyethanol (fraction 2). The fractionation temperatures were respectively 25° C., 138° C., 90° C., 100° C. and 125° C. Fraction 4 eluted at 100° C. was taken as the polyethylene fraction.

EXAMPLE 1

In a plant operating continuously according to the mixed liquid-gas polymerization technique, runs were carried out under the conditions specified in Table 1.

The polymerization was carried out in the presence of a catalyst system in a series of three reactors equipped with devices to transfer the product from one reactor to the one immediately next to it.

Preparation of the Solid Catalyst Component

Into a 500 ml four-necked round flask, purged with nitrogen, 250 ml of $TiCl_4$ are introduced at 0° C. While stirring, 10.0 g of microspheroidal $MgCl_2.1.9C_2H_5OH$ (prepared according to the method described in ex. 2 of U.S. Pat. No. 4,399,054 but operating at 3000 rpm instead of 10000 rpm) and 9.1 mmol of diethyl 2,3-(diisopropyl)succinate are added. The temperature is raised to 100° C. and maintained for 120 min. Then, the stirring is discontinued, the solid product was allowed to settle and the supernatant liquid is siphoned off. Then 250 ml of fresh $TiCl_4$ are added. The mixture is reacted at 120° C. for 60 min and, then, the supernatant liquid is siphoned off. The solid is washed six times with anhydrous hexane (6×100 ml) at 60° C.

Catalyst System and Prepolymerization Treatment

The solid catalyst component described above was contacted at 12° C. for 24 minutes with aluminium triethyl (TEAL) and dicyclopentyldimethoxysilane (DCPMS) as outside-electron-donor component. The weight ratio between TEAL and the solid catalyst component and the weight ratio between TEAL and DCPMS are specified in Table 1.

The catalyst system is then subjected to prepolymerization by maintaining it in suspension in liquid propylene at 20° C. for about 5 minutes before introducing it into the first polymerization reactor.

Polymerization

The polymerisation run is conducted in continuous in a series of three reactors equipped with devices to transfer the product from one reactor to the one immediately next to it. The first reactor is a liquid phase reactor, and the second and third reactors are fluid bed gas phase reactors. Polymer (a) is prepared in the first reactor, while polymers (b) and (c) are prepared in the second and third reactor, respectively.

Temperature and pressure are maintained constant throughout the course of the reaction. Hydrogen is used as molecular weight regulator.

The gas phase (propylene, ethylene and hydrogen) is continuously analysed via gas-chromatography.

At the end of the run the powder is discharged and dried under a nitrogen flow. The polymerization conditions are reported in table 1.

The propylene compositions were added with the following additives Irgafos 168, 800 ppm Atmer 163, 10000 ppm GMS 90, 900 ppm Na Benzoate. The previously said Irganox 1010 is pentaerytrityl tetrakis 3-(3,5-di-tert-butyl-4-hydroxyphenyl)propanoate, while Irgafos 168 is tris(2,4-di-tert-butylphenyl)phosphite, both marketed by Ciba-Geigy.

Then the polymer particles are introduced in a twin screw extruder Berstorff (L/D=33).

Temperature of the feeding section: 190-210° C.
Melt temperature: 240° C.
Temperature of the die section: 230° C.
Flow rate: 16 Kg/h
Totational speed: 250 rpm
The polymer features are reported in table 2

TABLE 1

| Polymerization Process | | |
|---|---|---|
| Example 1 | | |
| TEAL/solid catalyst component weight ratio | | 8 |
| TEAL/DCPMS weight ratio | | 5 |

TABLE 1-continued

| Polymerization Process | | |
|---|---|---|
| Liquid phase reactor | | |
| Polymerisation temperature | ° C. | 70 |
| Pressure | Barg | 39.6 |
| Residence time | minutes | 73 |
| H2 bulk | molppl | 8300 |
| 1st gas phase reactor | | |
| Polymerisation temperature | ° C. | 80 |
| Pressure | Barg | 14 |
| Residence time | min | 10 |
| C2-/(C2- + C3-) | Mol ratio | 0.28 |
| H2/C2 | Mol ratio | 0.058 |
| 2nd gas phase reactor | | |
| Polymerisation temperature | ° C. | 100 |
| Pressure | Barg | 13 |
| Residence time | Min | 18 |
| C2-/(C2- + C3-) | Mol ratio | 0.97 |
| H2/C2 | Mol ratio | 0.15 |

H2 bulk = hydrogen concentration in the liquid monomer;
C2- = ethylene;
C3- = Propylene

TABLE 2

| Example | | 1 |
|---|---|---|
| Component a) | | |
| Homopolymer content | % | 69 |
| MFR "L" | g/10' | 200 |
| Xylene soluble fraction | % | 3.0 |
| Pentad content of the xylene insoluble fraction | molar % | >97.5 |
| Component b) | | |
| Copolymer content | % | 10 |
| Ethylene content in component b) | % | 44 |
| Intrinsic viscosity Xylene soluble fraction* | dl/g | 2.6 |
| Component c) | | |
| Polyethylene content | % | 21 |
| Intrinsic viscosity of polyethylene** | dl/g | 2.0-3.5 |
| Properties of the composition | | |
| Ethylene content | % | 25 |
| Xylene -soluble fraction | % | 13 |
| MFR | g/10' | 54 |
| Flexural Modulus | MPa | 1425 |
| Izod at 23° C. | kJ/m² | 4.5 |
| Izod at 0° C. | kJ/m² | 3.7 |
| Izod at −20° C. | kJ/m² | 4.3 |
| D/B TT | ° C. | −45 |
| Tens. Str. @ yield | MPa | 24.3 |
| Elong. @ yield | % | 3.1 |
| Tens. Str. @ break | MPa | 23.9 |
| Elong. @ break | % | 6.0 |
| Hexane - extr. (on Film) powder | % | 3.3 |
| Whitening resistance: diameter (mm*10) of the whitening area due to a ram falling from a | 5 cm height | mm | 80 |
| | 10 cm height | mm | 110 |
| | 20 cm height | mm | 150 |
| | 30 cm height | mm | 170 |
| | 76 cm height | mm | 200 |

*calculated taking into account the intrinsic viscosity and the amount of the xylene soluble fraction of component a)
**measured on fraction 4 after TREF fractionation of the composition

COMPARATIVE EXAMPLE 1

Example 3 of wo2006/067023 was repeated and the hexane solubles has been measured they resulted to be 6.2 wt %

The invention claimed is:

1. A polymer composition comprising (percent by weight):
   a) 57%-74% of a crystalline propylene polymer having an amount of isotactic pentads (mmmm), measured by $^{13}$C-MNR on the fraction insoluble in xylene at 25° C., higher than 97.5 molar %;
   b) 8 to 15%, of an elastomeric copolymer of ethylene and propylene, the copolymer having an amount of recurring units deriving from ethylene ranging from 30% to 50%, and being partially soluble in xylene at ambient temperature; the polymer fraction soluble in xylene at ambient temperature having an intrinsic viscosity value ranging from 2.5 to 3.5 dl/g; and
   c) 18-28%, of ethylene homopolymer having an intrinsic viscosity value ranging from 1.5 to 4 dl/g;
   said composition having a value of melt flow rate ranging from 35 to 60 g/10 min, and the amount of hexane extractables lower than 4.0 wt %.

2. The polymer composition according to claim 1 wherein crystalline propylene (a) is from 62 to 71 wt %, elastomeric copolymer (b) is from 9 to 12 wt % and polyethylene (c) is from 20 to 25 wt % with respect to the whole polymer composition.

3. The polymer composition according to claim 1 wherein the composition has a content of component (b) plus component (c) in amounts of between 25 wt % and 35 wt %.

4. A polymerization process for the preparation of
   a polymer composition comprising (percent by weight):
   a) 57%-74%, of a crystalline propylene polymer having an amount of isotactic pentads (mmmm), measured by $^{13}$C-MNR on the fraction insoluble in xylene at 25° C., higher than 97.5 molar %;
   b) 8 to 15%, of an elastomeric copolymer of ethylene and propylene, the copolymer having an amount of recurring units deriving from ethylene ranging from 30% to 50%, and being partially soluble in xylene at ambient temperature; the polymer fraction soluble in xylene at ambient temperature having an intrinsic viscosity value ranging from 2.5 to 3.5 dl/g; and
   c) 18-28%, of ethylene homopolymer having an intrinsic viscosity value ranging from 1.5 to 4 dl/g;
   said composition having a value of melt flow rate ranging from 35 to 60 g/10 min, and the amount of hexane extractables lower than 4.0 wt %,
   comprising the step of preparing the polymer composition in at least three sequential polymerisation stages wherein crystalline polymer (a), elastomeric polymer (b) and polyethylene (c) are prepared in separate subsequent stages, operating in each stage, except the first step, in the presence of the polymeric material formed and the catalyst used in the immediately preceding polymerisation stage.

* * * * *